(12) United States Patent
Flachsbart

(10) Patent No.: US 11,761,840 B1
(45) Date of Patent: Sep. 19, 2023

(54) SYSTEMS AND METHODS FOR WATER DETECTION

(71) Applicant: United Services Automobile Association (USAA), San Antonio, TX (US)

(72) Inventor: Matthew T. Flachsbart, Grapevine, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 308 days.

(21) Appl. No.: 16/255,506

(22) Filed: Jan. 23, 2019

Related U.S. Application Data

(60) Provisional application No. 62/620,824, filed on Jan. 23, 2018.

(51) Int. Cl.
| | |
|---|---|
| *G01M 3/00* | (2006.01) |
| *G01M 3/02* | (2006.01) |
| *G01M 3/16* | (2006.01) |
| *G01M 3/30* | (2006.01) |
| *G01M 3/26* | (2006.01) |

(52) U.S. Cl.
CPC ............... *G01M 3/02* (2013.01); *G01M 3/002* (2013.01); *G01M 3/16* (2013.01); *G01K 2207/00* (2013.01); *G01M 3/00* (2013.01); *G01M 3/26* (2013.01); *G01M 3/30* (2013.01)

(58) Field of Classification Search
CPC ... G01M 3/00; G01M 3/02; G01M 3/16; G01M 3/002; G01M 3/30; G01M 3/26; G01K 2207/00
See application file for complete search history.

(56) References Cited

U.S. PATENT DOCUMENTS 10,042,341 B1* 8/2018 Jacob ...................... E04B 1/92
10,352,759 B1* 7/2019 Jensen ................. A47G 23/12
(Continued)

FOREIGN PATENT DOCUMENTS

| RU | 2609140 C1* | 1/2017 | |
|---|---|---|---|
| WO | 2015063931 A1* | 5/2015 | ................. E03B 7/003 |

(Continued)

OTHER PUBLICATIONS

Almoussawi, Raid, and Colin Christian. "Fundamentals of quantitative risk analysis." Journal of Hydroinformatics 7.2 (2005): 61-77. (Year: 2005).*

(Continued)

*Primary Examiner* — Daniel S Larkin
*Assistant Examiner* — Fatemeh Esfandiari Nia
(74) *Attorney, Agent, or Firm* — Fletcher Yoder P.C.

(57) ABSTRACT

A system for detecting water in an environment includes a first sensor configured to provide first feedback indicative of a temperature of the environment, a second sensor configured to provide second feedback indicative of a humidity of the environment, and an electronic circuit having a processor configured to execute one or more instructions stored on a memory of the electronic circuit. The one or more instructions are configured to receive the first feedback from the first sensor, receive the second feedback from the second sensor, generate a risk score by comparing the first feedback and the second feedback to baseline data stored on the memory of the electronic circuit, and provide an indication of a water detection event when the risk score is equal to or exceeds a threshold value.

19 Claims, 6 Drawing Sheets

(56) References Cited

U.S. PATENT DOCUMENTS

| | | | | |
|---|---|---|---|---|
| 11,003,334 | B1* | 5/2021 | Conway et al. | G06Q 40/08 |
| 2005/0285748 | A1* | 12/2005 | Pedraza et al. | F24F 11/30 |
| | | | | 340/602 |
| 2014/0338428 | A1* | 11/2014 | Bright | G01M 3/3254 |
| | | | | 73/49.2 |
| 2017/0301030 | A1* | 10/2017 | Wedig et al. | G06Q 40/08 |
| 2018/0005125 | A1* | 1/2018 | Fadell et al. | H05B 47/115 |
| 2018/0206354 | A1* | 7/2018 | Yoon et al. | G06F 1/1688 |
| 2019/0064998 | A1* | 2/2019 | Chowdhury et al. | G06F 3/04144 |
| 2021/0381207 | A1* | 12/2021 | Brotherton et al. | E03B 7/071 |

FOREIGN PATENT DOCUMENTS

| | | | | |
|---|---|---|---|---|
| WO | 2015113170 A1* | 8/2015 | | G06F 1/1626 |

OTHER PUBLICATIONS

John T. Reynolds, "Risk Based Inspection - Where Are We Today?" Paper presented at the Corrosion 2000, Orlando, Florida, Mar. 2000. (Year: 2000).*

Mounce, Stephen R., Richard B. Mounce, and Joby B. Boxall. "Novelty detection for time series data analysis in water distribution systems using support vector machines." Journal of hydroinformatics 13.4 (2011): 672-686. (Year: 2011).*

English translation of WO2015063931A1 (Year: 2015).*

* cited by examiner

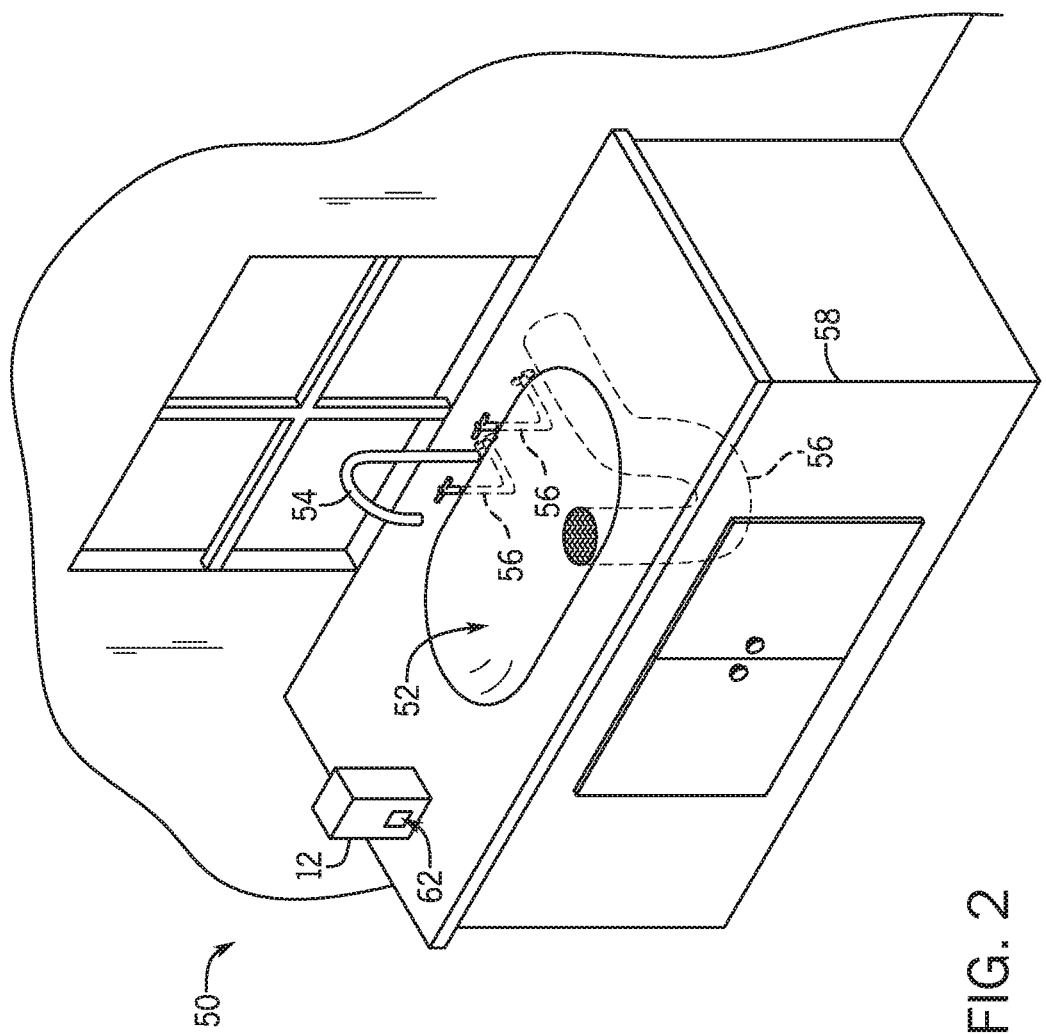
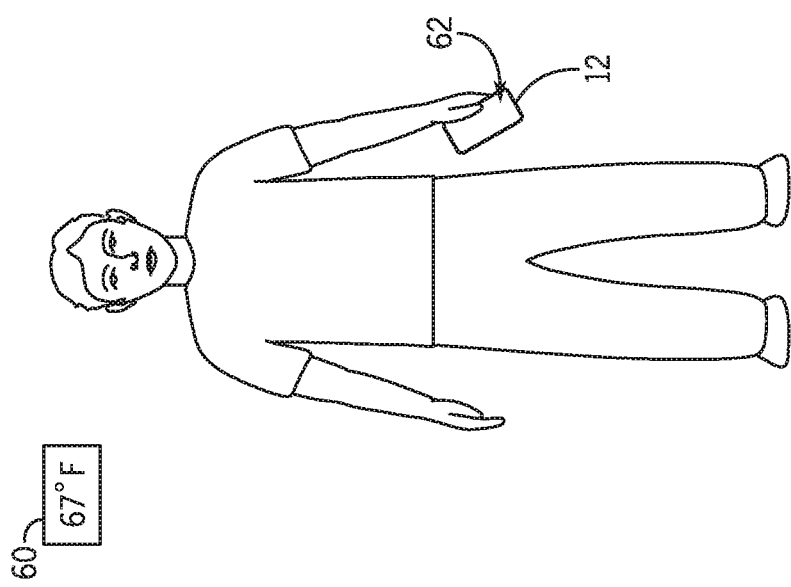
FIG. 2

SYSTEMS AND METHODS FOR WATER DETECTION

CROSS-REFERENCE TO RELATED APPLICATION

This application claims priority to and the benefit of U.S. Provisional Application Serial No. 62/620,824 entitled "SYSTEMS AND METHODS FOR WATER DETECTION," filed Jan. 23, 2018, which is hereby incorporated by reference in its entirety for all purposes.

BACKGROUND

The present disclosure relates generally to systems and methods for water detection.

Water damage leads to common claims on property insurance policies. Early detection of water leaks can substantially lessen the severity of water damage. However, leaks often occur in pipes that are hidden behind walls or in cracks in foundations or other fluid pathways that are not readily observable. When the leaks are eventually observed, significant damage may have occurred. Unfortunately, traditional water detection devices are purchased as standalone components and placed in locations where leaks may occur. Such devices may be expensive, and consumers may be motivated to purchase multiple devices to cover all areas of a structure where leaks may occur.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one embodiment of the present disclosure, a system for detecting water in an environment includes a first sensor configured to provide first feedback indicative of a temperature of the environment, a second sensor configured to provide second feedback indicative of a humidity of the environment, and an electronic circuit having a processor configured to execute one or more instructions stored on a memory of the electronic circuit. The one or more instructions are configured to receive the first feedback from the first sensor, receive the second feedback from the second sensor, generate a risk score by comparing the first feedback and the second feedback to baseline data stored on the memory of the electronic circuit, and provide an indication of a water detection event when the risk score is equal to or exceeds a threshold value.

In one embodiment of the present disclosure, a method for detecting water includes receiving first feedback from one or more sensors of an electronic device of a user positioned in a structure, receiving second feedback from one or more external electronic devices over a network, generate a risk score by comparing the first feedback and the second feedback to baseline data stored in first memory of the electronic device, in second memory in communication with the network, or a combination thereof, and indicating a water detection event when the risk score is equal to or exceeds a threshold value.

In one embodiment of the present disclosure, a system includes a first electronic device having one or more sensors configured to provide first feedback indicative of conditions within a structure, a second electronic device configured to provide second feedback indicative of conditions outside of the structure, and an electronic circuit having a processor configured to execute one or more instructions stored on a memory of the electronic circuit. The one or more instructions are configured to receive the first feedback from the first electronic device, receive the second feedback from the second electronic device, generate a risk score by comparing the first feedback and the second feedback to baseline data stored on the memory of the electronic circuit, and determine a water detection event when the risk score is equal to or exceeds a threshold value.

DRAWINGS

These and other features, aspects, and advantages of the present disclosure will become better understood when the following detailed description is read with reference to the accompanying drawings in which like characters represent like parts throughout the drawings, wherein:

FIG. 2 illustrates an embodiment of a user utilizing the water detection system of FIG. 1 in an environment of a structure, in accordance with an aspect of the present disclosure;

DETAILED DESCRIPTION

Figure 1:
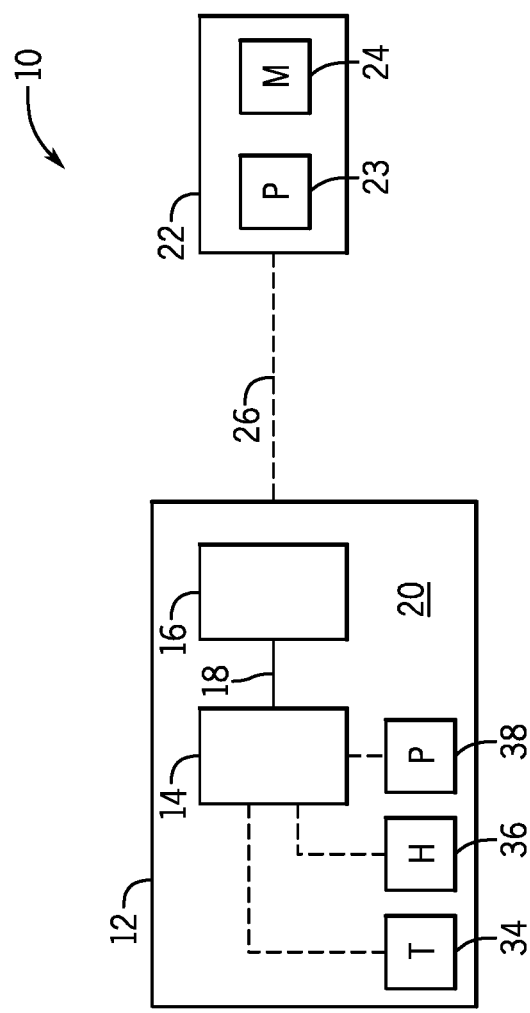
FIG. 1 is a schematic of an embodiment of a water detection system, in accordance with an aspect of the present disclosure.

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward a water detection system that may be utilized to monitor the presence of water (e.g., leaks, floods) in a predetermined location, such as a home (e.g., under the sink, in the walls, in the attic, near toilets, near washing machines, near dishwashers, near water heaters), a car, a commercial building, and/or other suitable locations. The water detection system may utilize sensors that are present in electronic devices already in possession of a user to detect water. For example, electronic devices, such as smart phones, smart wearable devices (e.g., smart watches), tablets, laptop computers, desktop computers, voice-activated devices, and/or other computing devices, may include temperature sensors (e.g., thermometers, thermocouples, resistive temperature measuring devices, infrared sensors), humidity sensors (e.g., capacitive humidity sensors, resistive humidity sensors, thermal conductivity based humidity sensors), pressure sensors (e.g., barometers, strain gauges, piezoelectric sensors, potentiometers), location sensors (e.g., global positioning system (GPS) sensors, indoor positioning systems (IPS) systems), or other suitable sensors. In addition, electronic devices are generally capable of establishing a wireless connection to a network or server (e.g., via Wi-Fi, near field communication, Bluetooth, Zigbee, Z-wave, ISM, an embedded wireless module, and/or or another suitable wireless communication network). As such, a position of the electronic device within a structure may be tracked based on a signal strength between the electronic device and a component (e.g., a modem or router) of the network or server. Further still, electronic devices may be capable of obtaining information over the network or server, such as weather reports.

Accordingly, the electronic device may utilize feedback from one or more sensors of the electronic device, information related to a signal strength between the electronic device and the network or server, and/or information obtained from the network or server (e.g., a weather report) to determine whether water is present within a particular area of a structure (e.g., a home or commercial building). In accordance with embodiments of the present disclosure, the electronic device may utilize such information to determine that water is likely to be present in abnormal quantities in a particular location within the structure. For example, an electronic device may calculate a risk score by comparing information received from the sensors, the network, and/or the server to baseline data indicative of normal conditions within the structure (e.g., conditions where no leaks, flooding, or other water accumulation indications are present). As a non-limiting example, when feedback from the sensors of the electronic device detect a relatively high humidity when compared to the baseline data for a particular location within a structure, and weather reports received from the network and/or server do not indicate high humidity conditions outside of the structure, the risk score may exceed a predetermined threshold value and determine that a water detection event likely occurred at the particular location within the structure. In some embodiments, the electronic device may provide a notification (e.g., an alert) to the user indicating that water may be present in the particular location. Accordingly, water detection may be achieved using electronic devices already in the possession of a user, thereby eliminating standalone devices that are positioned in particular locations where water may accumulate in the structure.

In conjunction with sensors, the electronic devices may be configured to cumulatively collect and analyze the information described above to detect likely water accumulation using software (e.g., via a mobile application or another program) that may be installed (e.g., downloaded) on each electronic device and/or on a server communicatively coupled to the electronic devices. The software may thus store instructions within tangible, machine-readable media (e.g., memory) of the electronic device and/or the server, which may be executed by a processor of the electronic device and/or the server. In some embodiments, the instructions may be configured to receive feedback from the sensors of the electronic device and/or data and information from the network substantially continuously or at predetermined intervals (e.g., hourly, daily, weekly). The software may also be configured to store data indicative of normal conditions within the tangible, machine-readable media (e.g., memory) of the electronic device and/or the server and compare the feedback, data, and/or information to stored baseline data continuously or at the predetermined intervals. When the risk score that is determined based at least on the feedback, data, and/or information received equals or exceeds a threshold value, the software may execute instructions for the electronic device to notify (e.g., alert) the user of a potential water detection event.

Turning now to the drawings, FIG. 1 is a schematic of a water detection system 10 that includes an electronic device 12 having an electronic circuit 14 (e.g., a processor and/or other circuitry), and memory 16. As discussed above, the electronic device 12 may include a smart phone, a smart wearable (e.g., watch), a tablet, a laptop computer, a desktop computer, a voice-activated computing device, another computing device, or a combination thereof. The electronic circuit 14 and/or the memory 16 of the electronic device 12 may be electronically connected together using solder, a wire, a bus 18, or another suitable technique. Additionally, the electronic circuit 14 and/or the memory 16 may be physically coupled to one another by a connector 20 (e.g., a circuit board). The electronic device 12 may also be within communication range of an electronic network 22 (e.g., a server, the Internet). The network 22 may include a processor 23 and/or memory 24 that may be configured to store instructions that the processor 23 executes. In some embodiments, the electronic device 12 may be configured to communicate with the network 22, and thus, receive information from external electronic devices (e.g., databases, additional servers, external computing devices) that are also communicatively coupled to the network 22.

In some embodiments, the electronic device 12 includes a temperature sensor 34 a humidity sensor 36, a pressure sensor 38 and/or another suitable sensor. These sensors may be attached, coupled, and/or retrofitted to the electronic device 12. In some embodiments, the sensors may be included in one or more sensing devices that are separate from, but coupled to, the electronic device 12. In any case, the temperature sensor 34, the humidity sensor 36, and/or the pressure sensor 38 may provide feedback to the electronic circuit 14, which may be utilized to determine that accumulation of water has likely occurred. For example, the temperature in the environment surrounding the electronic device 12 may fluctuate (e.g., increase or decrease) upon exposure to a significant amount of water. Additionally or alternatively, the humidity in the environment surrounding the electronic device 12 may rapidly increase upon exposure to significant amounts of water. The water detection system 10 may compare the feedback from the humidity sensor 36 to weather conditions outside of the structure. As such, the water detection system 10 may determine that an increase in humidity in the environment surrounding the electronic device 12 may be caused by precipitation outside of the structure instead of accumulation of water in the structure. Further still, the pressure sensor 38 my provide feedback indicative of weather conditions outside of the structure. In some embodiments, an increase in pressure may be indicative of precipitation, such that the electronic device 12 may associate an increase in humidity and/or temperature fluctuations with the precipitation outside of the structure instead of the accumulation of water in the structure. In any case, feedback from the temperature sensor 34, the humidity sensor 36, and/or the pressure sensor is analyzed (e.g., compared to baseline conditions) to determine whether water is present in the relevant environment (e.g., structure).

While a single electronic device 12 is shown in FIG. 1, it should be noted that more than one of the electronic devices 12 may be used together (e.g., one, two, three, four, five, six, seven, eight, nine, ten, or more of the electronic devices 12 may be connected to the same electronic network 22) in the water detection system 10. In such embodiments, the water detection system 10 may be configured to utilize data and/or information from each electronic device 12, which may enable the water detection system 10 to monitor multiple locations within the structure and/or to compare feedback from electronic devices 12 positioned proximate to one another (e.g., within 5 feet, within 10 feet, within 15 feet). For example, some electronic devices 12 are substantially stationary within a structure, such as voice-activated devices and/or desktop computers. As such, substantially stationary devices may monitor conditions at specific locations within the structure over time. Additionally or alternatively, other electronic devices 12 may be held or carried by a person, and thus, move within the structure. Portable electronic devices 12, such as smart phones, smart wearables (e.g., watches), tablets, and/or laptop computers, may monitor a plurality of locations within the structure over time. In some embodiments, portable electronic devices 12 may be configured to collect measurements (e.g., temperature and/or humidity) and/or information more frequently than substantially stationary electronic devices 12 because the portable electronic devices 12 move frequently between locations within the structure. In other embodiments, the portable electronic devices 12 and the substantially stationary electronic devices 12 may collect measurements at substantially the same intervals.

In some embodiments, the electronic device 12 may include software that may communicate with the network 22 and/or with other electronic devices 12 communicatively coupled to the network 22 and/or within the structure. For example, the electronic device 12 may include an application or computer program that may be configured to receive feedback from the temperature sensor 34, the humidity sensor 36, other electronic devices, and/or the network 22. As such, the application or computer program may be configured to analyze the feedback and determine whether a relatively large quantity of water is present at a particular location (e.g., a location of the electronic device 12 at a particular time) within the structure.

In some embodiments, the electronic circuit 14 may be capable of transmitting a wireless electronic signal 26 for communication with the network 22 using one or more of a variety of wireless communication techniques. For example, the electronic circuit 14 may be configured to wirelessly communicate with the network 22 using Wi-Fi, near field communication, Bluetooth, Zigbee, Z-wave, ISM, an embedded wireless module, or another suitable wireless communication network. Further, the electronic circuit 14 may be programmed to send a message to an address via the network 22, such as an IP address, URL, email address, telephone number, a dedicated monitoring station, or other type of electronic address known to those of skill in the art, and any combination of the same. In still further embodiments, an application and/or computer program installed on the electronic device 12 may be configured to generate a message (e.g., a text message) to be displayed on the electronic device 12. For example, the message may include an alert to the user and/or a description (e.g., a name designated by the user) of a location within the structure where a relatively high amount of water may be present.

FIG. 2 illustrates an embodiment of an environment 50 within a structure (e.g., a home or commercial building) that may include features for supplying and/or otherwise transporting water to or from the structure. For example, as shown in the illustrated embodiment of FIG. 2, the environment 50 includes a sink 52 having a faucet 54, which may supply water for a variety of purposes (e.g., washing hands, cleaning dishware). In some cases, the faucet 54 and/or plumbing 56 (e.g., conduits, pipes, drains, valves, or fittings) associated with the faucet 54 may incur wear that ultimately enables water to leak into the environment. Unfortunately, the plumbing 56 associated with the faucet 54 may be hidden from view from a user (e.g., via a cabinet 58), such that the user may not be immediately aware of a leak. Accordingly, the electronic device 12 of the user may be utilized to detect such leaks and/or other accumulation of water.

As discussed above, the temperature sensor 34 and/or the humidity sensor 36 may provide feedback indicative of a temperature and/or humidity level in the environment 50 to the electronic circuit 14. Additionally or alternatively, the electronic circuit 14 may receive and/or retrieve information from external electronic devices over the network 22. For example, in some embodiments, the electronic circuit 14 may retrieve data and/or information, such as weather reports for the surrounding area of the structure. As such, the electronic circuit 14 may compare the feedback from the temperature sensor 34 and/or the humidity sensor 36 with weather information received via the network 22 to determine whether the data is consistent with one another. As a non-limiting example, the electronic circuit 14 may receive feedback from the humidity sensor 36 indicating a relatively high humidity level in the environment 50 when compared to baseline conditions (e.g., conditions where water is not leaking or accumulating in the environment 50 has been confirmed). However, the electronic circuit 14 may also retrieve weather information over the network 22 indicating a relatively high humidity level outside of the structure. In some cases, the electronic circuit compares the humidity feedback from the humidity sensor 36 with the humidity level from the weather data and compares the data to one another. The electronic circuit 14 may execute an algorithm stored on the memory 16 to determine a risk score indicative of whether accumulation of water occurred in the environment 50 (e.g., the risk score may indicate whether the humidity feedback from the humidity sensor 36 is consistent with the high humidity level outside of the structure). If the feedback from the humidity sensor 36 is consistent with humidity levels outside of the structure and with the baseline conditions, the electronic circuit 14 may determine that no water accumulation has occurred in the environment 50. Conversely, if the feedback from the humidity sensor 36 is not consistent with the humidity levels outside of the structure and/or with the baseline conditions, the electronic circuit 14 may be configured to alert the user that water accumulation may have occurred in the environment 50.

Additionally or alternatively, the electronic circuit 14 receives temperature feedback from the temperature sensor 34 and compares the temperature feedback to the baseline conditions and/or the weather information received over the server 22. In some cases, accumulation of water in the environment 50 leads to a fluctuation (e.g., increase or decrease) in temperature. Accordingly, when the temperature feedback falls below or climbs above the baseline conditions (e.g., a baseline temperature) of the environment 50, the electronic circuit 14 may compare the temperature with the weather information received over the network 22 and/or a temperature setting of a temperature control system 60 (e.g., a thermostat) for the environment 50 (e.g., communicatively coupled to the electronic device 12 via the network 22). The electronic circuit 14 may then determine the risk score, which may indicate whether the temperature fluctuation results from a change in outdoor temperature (e.g., determined from the weather information), a change in indoor temperature (e.g., due to a temperature setting on the temperature control system 60), a water leak and/or water accumulation in the environment 50, or another suitable reason.

As discussed above, the memory 16 may store baseline conditions for one or more particular locations (e.g., the environment 50) in the structure. In some embodiments, the baseline conditions are specific to a particular location in the structure. For example, a bathroom generally includes higher humidity levels than a dining room in the house. As such, baseline conditions may be stored for particular locations in the structure. The baseline conditions may take into account a variety of factors, such as time of day, time of year, regular water usage in the particular location (e.g., showers, handwashing, dishwashing), regular use of temperature control devices in the particular location (e.g., fans, air conditioners, heaters), regular use of humidity control devices in the particular location (e.g., humidifiers or dehumidifiers), conditions in the particular location when similar outdoor weather conditions exist, or any combination thereof. In some embodiments, the baseline conditions may be collected over a predetermined amount of time (e.g., a month, a year) to determine (e.g., learn) normal conditions within the structure for specific times of the day, specific times of the week, and/or specific times of the year. Additionally or alternatively, the baseline conditions may update based on changes of a user's routine and/or habits. For example, when the feedback received from the temperature sensor 34, the humidity sensor 36, the pressure sensor 38, and/or the server 22 differ from the baseline conditions, the user may be alerted to a potential water detection event. The user may be prompted to input that the potential water detection event was the result of water usage that occurred outside of a normal routine of the user. In any case, the baseline conditions may be compared (e.g., via an algorithm) to the feedback received from the temperature sensor 34, the humidity sensor 36, the pressure sensor 38, and/or information retrieved over the server 22 to determine potential water detection events. For example, one or more of the feedback from the temperature sensor 34, the feedback from the humidity sensor 36, the feedback from the pressure sensor 38, the information retrieved over the server 22, and/or the baseline conditions may be input into an algorithm to identify whether such data is indicative of water accumulation.

As such, when the feedback received by the electronic circuit 14 of the electronic device 12 differs from the baseline conditions beyond a threshold amount (e.g., the risk score is equal to or exceeds a threshold), the electronic device 12 may determine that water is present in the particular location in the structure. In some embodiments, the electronic circuit 14 uses an algorithm configured to perform statistical analysis to calculate the risk score and to determine whether measured conditions in the particular location (e.g., the environment 50) differ from the baseline conditions beyond the threshold amount. As discussed above, the electronic circuit 14 may receive feedback from the temperature sensor 34, the humidity sensor 36, the pressure sensor 38, and/or the server 22 substantially continuously (e.g., real-time feedback) or at predetermined intervals (e.g., hourly, daily, weekly). In some embodiments, the electronic circuit 14 receives the feedback at predetermined intervals based on whether the electronic device 12 is substantially stationary within the environment 50 or is frequently moving within the environment 50. Further, the electronic circuit 14 may receive the feedback at the predetermined intervals and then monitor the environment 50 substantially continuously upon determining that the risk score equals or exceeds the threshold value. The electronic circuit 14 may then determine whether the irregular conditions continue to occur for a prolonged period of time or are simply short-term and the result of deviant water usage (e.g., water usage outside of a user's normal routine).

In some embodiments, the electronic circuit 14 may determine a location of the electronic device 12 within the environment 50 based on a strength of a signal (e.g., a Wi-Fi signal) between the electronic circuit 14 and a component (e.g., a router or modem) of the network 22. For example, the signal strength between the electronic circuit 14 and the component of the network 22 may increase as a distance between the electronic device 12 and the component of the network 22 (e.g., a router or modem) decreases. Therefore, the electronic circuit 14 may determine a location of the electronic device 12 within the environment 50 relative to the distance between the electronic device 12 and the component of the network 22. In other embodiments, the electronic device 12 may include a location sensor (e.g., global positioning system (GPS) sensors, indoor positioning systems (IPS) systems) that may be coupled to the electronic circuit 14 to determine a location of the electronic device 12 within the structure. Additionally or alternatively, instructions stored on the network 22 (e.g., the memory 24) and/or the electronic circuit 14 may query other electronic devices near the location of the electronic device 12 when a potential water detection event is determined. For example, the instructions may request that the nearby electronic devices provide feedback from corresponding temperature sensors, humidity sensors, pressure sensors, or other suitable sensors and compare the feedback to the feedback received by the electronic device 12. As such, the water detection system 10 performs a verification process to determine whether the temperatures sensor 34, the humidity sensor 36, and/or the pressure sensor 38 of the electronic device are working properly.

Upon determination of a potential water detection event, the electronic device 12 may provide a message and/or an alert to the user via a display 62 of the electronic device 12. In some embodiments, the message and/or alert may include the risk score, which may be indicative of a likelihood of the water detection event, the severity of the water detection event, or a combination thereof. In some embodiments, the risk score may include a single weighted score that combines a variety of factors, such as variability from the baseline conditions, variability from weather reports or conditions, variability based on the water-usage routine of the user, duration of the variability from the baseline conditions, duration of the variability from the weather reports, duration of the variability from the water-usage routine, whether feedback from nearby electronic devices confirms the variability, or another suitable factor. In other embodiments, the risk score may include individual risk scores for one or more of the factors. In still further embodiments, the risk score may be determined based on Equation 1 or Equation 2 shown below, where $T(x)$ is a temperature input function, $H(y)$ is a humidity input function, and $P(z)$ is a pressure input function.

$$\text{Risk Score} = T(x) + H(y) + P(z) \quad (1)$$

$$\text{Risk Score} = T(x) * H(y) * P(z) \quad (2)$$

It should be noted that the temperature, humidity, and pressure functions of Equation 1 or Equation 2 may include one or more inputs, such as temperature from the temperature sensor 34, temperature from the temperature control system 60, temperature outside of the structure, humidity from the humidity sensor 36, humidity outside of the structure, pressure from the pressure sensor 38, pressure outside of the structure, another suitable input, or any combination thereof. In any case, the risk score enables the user to perceive whether the potential water detection event is actually caused by water accumulation in the environment 50. When the user determines that the potential water detection event is not caused by water accumulation, the user may input a reason (if one is known to the user) as to why the potential water detection event was caused (e.g., water usage outside of the user's routine).

Figure 3:
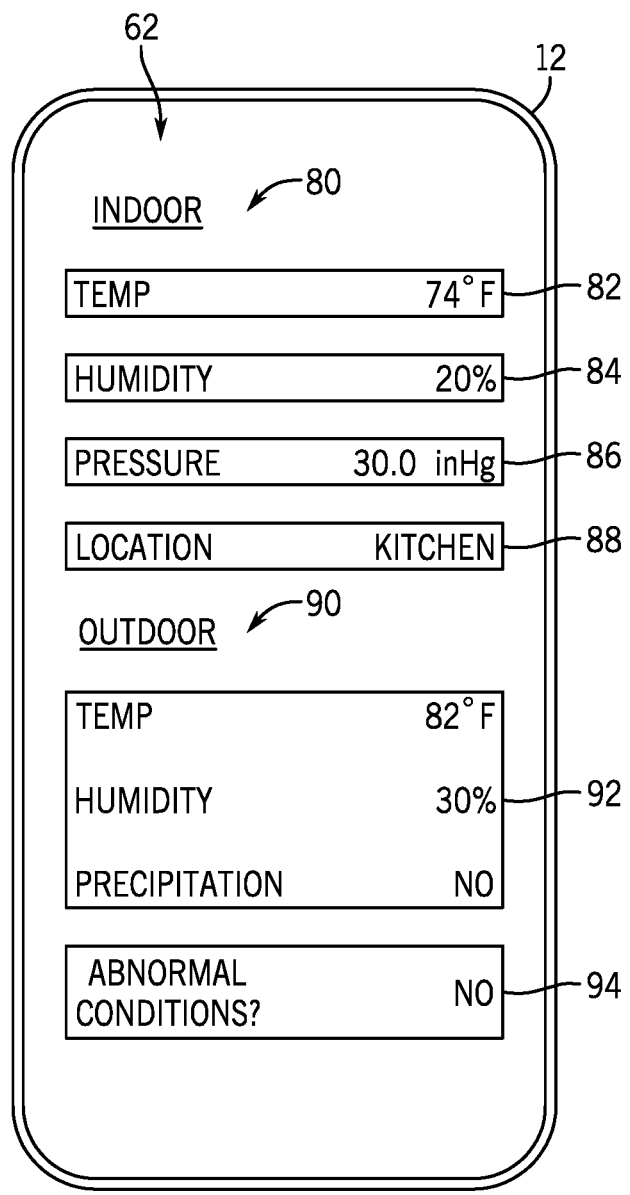
FIG. 3 is a schematic of an embodiment of a display that the water detection system may present on an electronic device of the user, in accordance with an aspect of the present disclosure.

FIG. 3 illustrates an embodiment of the display 62 of the electronic device 12 that may be shown to the user when opening an application or software program installed on the electronic device 12. As shown in the illustrated embodiment of FIG. 3, the display 62 includes data 80 that is related to the feedback 82 received from the temperature sensor 34, feedback 84 from the humidity sensor 36, feedback 86 from the pressure sensor 38, feedback 88 related to the signal strength between the electronic circuit 14 and the component of the network 22, and/or other suitable information. In other words, the data 80 is the information received by the electronic device 12 related to conditions in the environment 50. In some embodiments, the user may provide names for various locations within the structure, such that the water detection system 10 correlates the signal strength between the electronic circuit 14 and the component of the network 22 with the name provided. Accordingly, the water detection system 10 may indicate which location within the structure has incurred a potential water detection event.

Further, the display 62 may include data 90 that is related to feedback 92 received from an external computing device via the server 22. For example, the feedback 92 may include information related to weather conditions outside the structure, such as temperature, humidity, precipitation, chance of precipitation, cloud coverage, barometric pressure, wind speed, visibility, dew point, and/or other suitable information. While the illustrated embodiment of FIG. 3 shows the feedback 92 having temperature, humidity, and precipitation, it should be noted that the feedback 92 may include fewer data points or additional data points related to the weather conditions outside of the structure.

Figure 4:
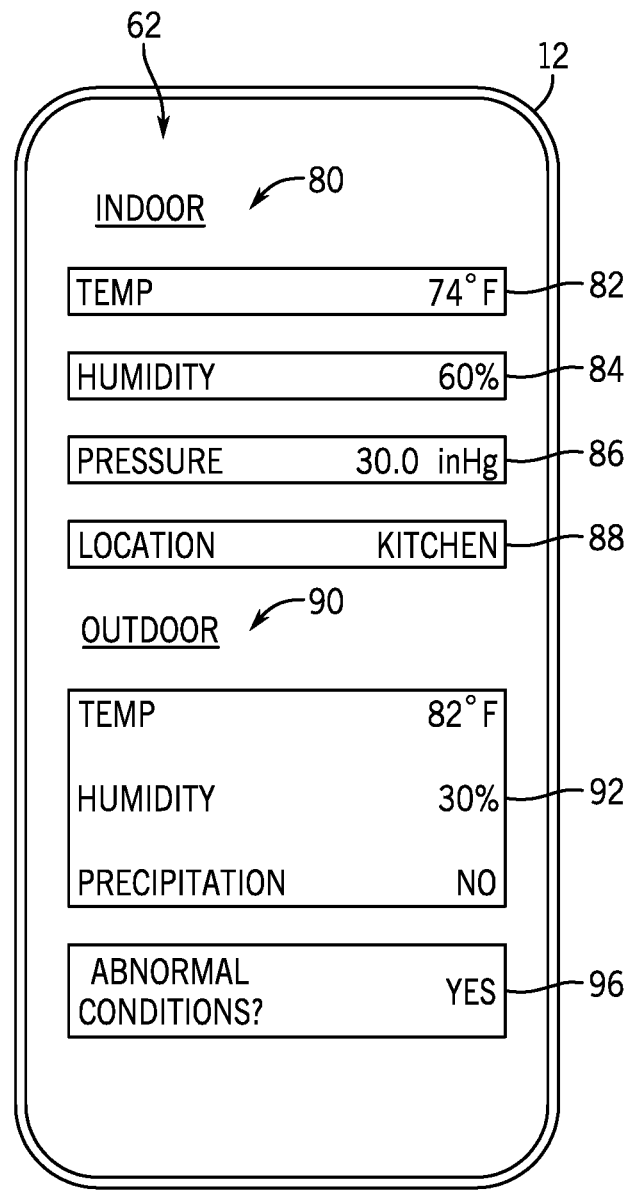
FIG. 4 is a schematic of an embodiment of a display that the water detection system may present on the electronic device of the user, in accordance with an aspect of the present disclosure.

Further, the display 62 may include an indicator 94 that visually shows the user whether a potential water detection event has occurred in the environment 50 (e.g., the specified location in the feedback 88). For instance, the water detection system 10 compares the data 80 with the data 90 to baseline conditions stored in the memory 16 of the electronic device 12 or the memory 24 of the network 22. The water detection system 10 determines the risk score (e.g., a likelihood of a water detection event) based on the comparison between the data 80, the data 90, and the baseline conditions and displays to the user whether a potential water detection event has occurred. For example, the water detection system 10 may generate the risk score and indicate that a water detection event occurs when the risk score is equal to or exceeds a threshold value. As a non-limiting example, the risk score may be a number between one and ten, where the threshold value is eight. As such, the indicator 94 may show that a water detection event has not occurred when the risk score is below eight. When the risk score is eight or above, the display 62 may include an indicator 96, as shown in FIG. 4. The indicator 96 displays to the user that a water detection event has likely occurred.

Figure 5:
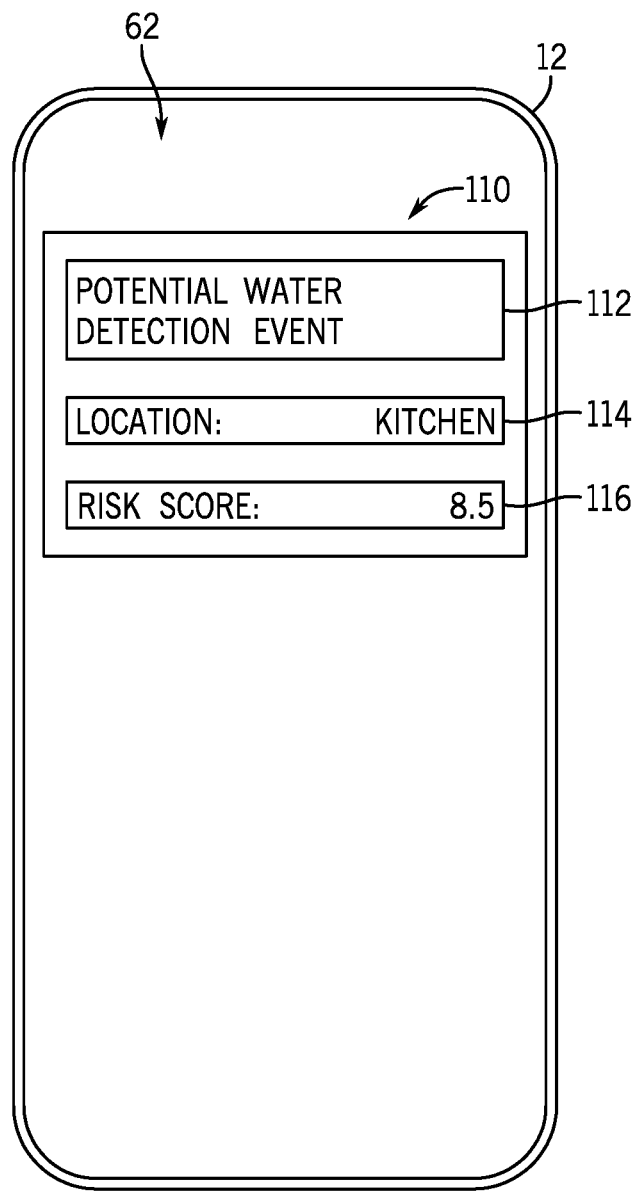
FIG. 5 is a schematic of an embodiment of a message that the water detection system may present on the electronic device of the user.

In some embodiments, the water detection system 10 provides a message or alert to the user automatically when a water detection event occurs. For example, FIG. 5 illustrates an embodiment of the display 62 having a water detection message 110 that may be sent to the user. In some embodiments, the water detection message 110 is sent to the user via a text message, a short message service (SMS), a push notification, an email, or using another suitable technique. In any event, the water detection message 110 may include a notification 112 that a water detection event likely occurred, a location 114 within the structure where the water detection event likely occurred, and/or a risk score 116. As discussed above, the location 114 may be determined based on a signal strength between the electronic circuit 14 of the electronic device 12 and the component (e.g., router or modem) of the network 22. The location 114 may be a customized name assigned by the user, such that the user may quickly identify where the water detection event likely occurred.

Further, as discussed above, the risk score 116 is generated based on the comparison between the data 80, the data 90, and the baseline conditions, variability of the data 80 and/or the data 90 from the baseline conditions, variability of the data 80 from the data 90 (e.g., weather reports or conditions), variability of the data 80 and/or the data 90 based on the water-usage routine of the user, duration of the variability of the data 80 and/or the data 90 from the baseline conditions, duration of the variability of the data 80 from the data 90 (e.g., weather reports), duration of the variability of the data 80 and/or the data 90 from the water-usage routine, whether feedback from nearby electronic devices confirms the variability, or another suitable factor. As shown in the illustrated embodiment of FIG. 5, the risk score 116 is a number between one and ten that may be generated based on statistical analysis of the above-mentioned factors. When the risk score 116 is at or above a threshold (e.g., eight out of ten) the water detection system 10 may determine that a water detection event likely occurred and automatically send the message 100 to the electronic device 12 of the user.

Figure 6:
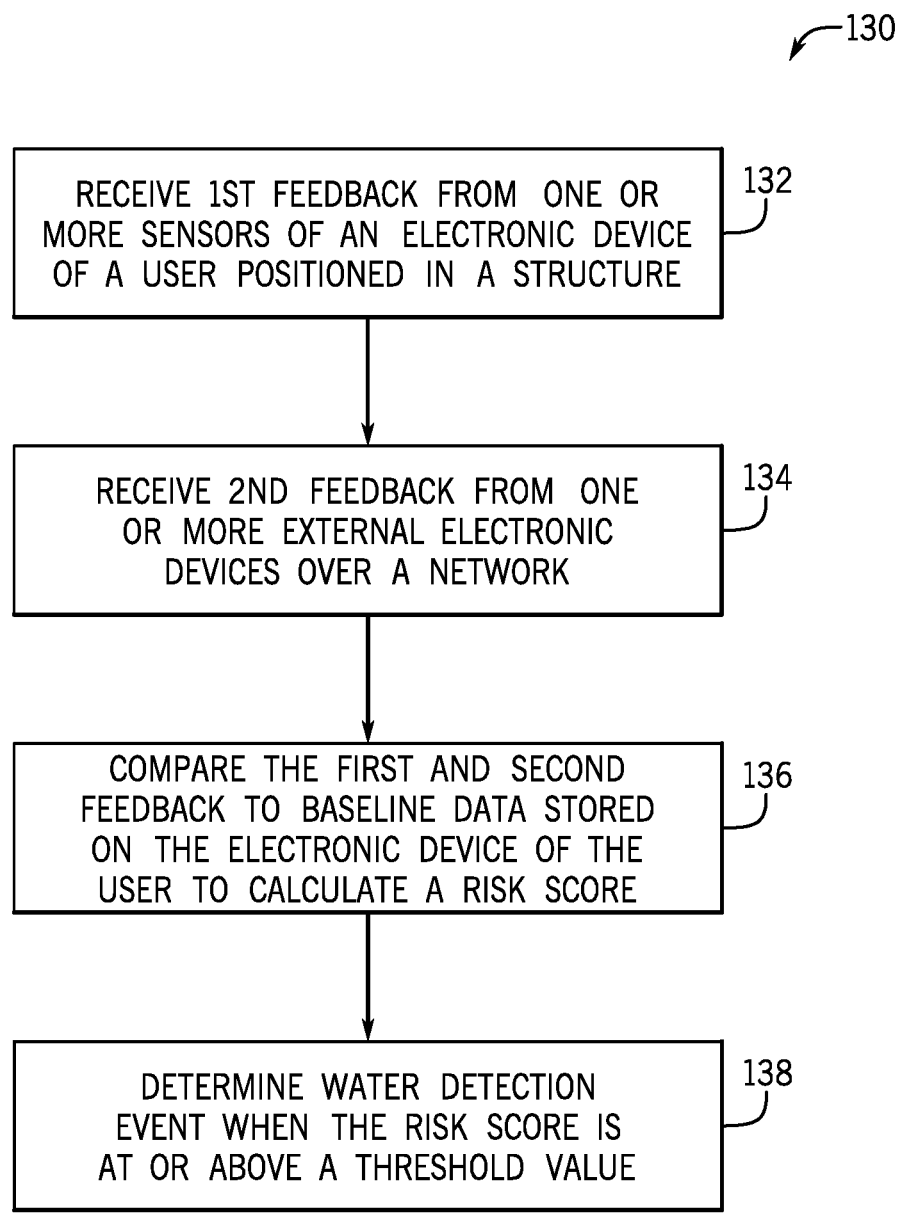
FIG. 6 is a flow chart of an embodiment of a process for determining a water detection event and reporting the event to the user, in accordance with an aspect of the present disclosure.

FIG. 6 is a flow chart of an embodiment of a method 130 for determining a water detection event and reporting the event to the user. At block 132, the water detection system 10 (e.g., via the electronic circuit 14 and/or the processor 23) receives first feedback (e.g., the data 80) from the temperature sensor 34, the humidity sensor 36, the pressure sensor 38, or another suitable sensor of the electronic device 12 at a particular location within the structure. At block 134, the water detection system 10 (e.g., via the electronic circuit 14 and/or the processor 23) receives second feedback (e.g., the data 90) from one or more external electronic devices (e.g., a database or an external computing device) over the network 22.

Accordingly, at block 136, the water detection system 10 (e.g., via the electronic circuit 14 and/or the processor 23) compares the first feedback and the second feedback to the baseline conditions to determine the risk score 116. As discussed above, the baseline conditions may take into account a variety of factors, such as time of day, time of year, regular water usage in the particular location (e.g., showers, handwashing, dishwashing), regular use of temperature control devices in the particular location (e.g., fans, air conditioners, heaters), regular use of humidity control devices in the particular location (e.g., humidifiers or dehumidifiers), conditions in the particular location when similar outdoor weather conditions exist, or any combination thereof. In any case, the baseline conditions may be stored in the memory 16 of the electronic device 12 and/or the memory 24 of the network 22.

As such, the water detection system 10 compares the first feedback and the second feedback to the baseline conditions and may generate the risk score 116 based on a variety of factors. In some embodiments, the factors for determining the risk score 116 are generated via statistical analysis of the first feedback, the second feedback, and the baseline conditions. For example, the factors for determining the risk score 116 may include variability of the first feedback and/or the second feedback from the baseline conditions, variability of the first feedback from the second feedback, variability of the first feedback and/or the second feedback based on the water-usage routine of the user, duration of the variability of the first feedback and/or the second feedback from the baseline conditions, duration of the variability of the first feedback from the second feedback, duration of the variability of the first feedback and/or the second feedback from the water-usage routine, whether feedback from nearby electronic devices confirms the variability, or another suitable factor.

At block 138, the water detection system 10 (e.g., via the electronic circuit 14 and/or the processor 23) determines whether a water detection event has occurred based on the risk score 116. For example, the risk score 116 may include a numeric value between one and ten. Additionally, the water detection system 10 may compare the risk score 116 to a predetermined threshold value. As a non-limiting example, when the risk score 116 includes a number between one and ten, the threshold value may be eight. As such, the water detection system 10 determines that a water detection event has occurred when the risk score 116 exceeds the threshold value and alerts the user. As discussed above, the water detection system 10 may generate a message to the user automatically upon determining that a water detection event likely occurred to notify the user.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for detecting water in an environment, comprising:
 a first sensor configured to provide first feedback indicative of a temperature of the environment;
 a second sensor configured to provide second feedback indicative of a humidity of the environment; and
 an electronic circuit of an electronic device comprising a processor configured to execute one or more instructions stored on a memory of the electronic circuit, wherein the one or more instructions are configured to cause the electronic circuit to:
  receive the first feedback from the first sensor, the second feedback from the second sensor, and third feedback indicative of conditions external to the environment via a network;
  receive baseline data from a thermostat via the network and store the baseline data on the memory of the electronic circuit, wherein the thermostat is external to the system;
  generate a risk score by comparing the first feedback, the second feedback, and the third feedback to the baseline data stored on the memory of the electronic circuit, wherein the risk score is representative of a likelihood that the first feedback and the second feedback is indicative of a presence of leaked water within the environment, wherein the first feedback is associated with a particular location within the environment and the baseline data is associated with the particular location within the environment; and
  provide an indication of a water detection event when the risk score is equal to or exceeds a threshold value, wherein the environment is external to the electronic device and the water indicated by the water detection event is external to the electronic device.

2. The system of claim 1, wherein the electronic device comprises a smart phone associated with a user.

3. The system of claim 1, comprising a display communicatively coupled to the electronic circuit, wherein the one or more instructions are configured to display the first feedback and the second feedback on the display.

4. The system of claim 3, wherein the one or more instructions are configured to cause the electronic circuit to provide the indication on the display upon determining the risk score is equal to or exceeds the threshold value.

5. The system of claim 1, comprising an additional sensor configured to provide additional feedback indicative of a pressure of the environment, wherein the one or more instructions are configured to cause the electronic circuit to:
 receive the additional feedback; and
 generate the risk score by further comparing the additional feedback to the baseline data stored on the memory of the electronic circuit.

6. The system of claim 1, wherein the one or more instructions are configured to cause the electronic circuit to:
 receive fourth feedback comprising weather conditions external to the environment; and
 generate the risk score by further comparing the fourth feedback to the baseline data stored on the memory of the electronic circuit.

7. The system of claim 1, wherein the electronic device comprises a smart phone, a smart wearable device, a tablet, a laptop computer, a desktop computer, a voice-activated device, or any combination thereof.

8. The system of claim 1, wherein the first sensor, the second sensor, and the electronic circuit are configured to be integrated into the electronic device.

9. A method for detecting water in a structure, comprising:
 receiving first feedback from one or more sensors integrated into an electronic device associated with a user;
 receiving second feedback from one or more external electronic devices over a network, wherein the one or more external electronic devices are external to the electronic device, and wherein the second feedback is indicative of conditions external to the structure;
 generating a risk score by comparing the first feedback and the second feedback to baseline data stored in first memory of the electronic device, in second memory in communication with the network, or a combination thereof, wherein the risk score is representative of a likelihood that the first feedback is indicative of a presence of leaked water within the structure; and
 indicating a water detection event inside the structure when the risk score is equal to or exceeds a threshold value, wherein the leaked water indicated by the water detection event is external to the electronic device.

10. The method of claim 9, comprising comparing the first feedback from the one or more sensors of the electronic device to third feedback from one or more additional sensors of an additional electronic device positioned nearby the electronic device relative to the structure.

11. The method of claim 9, wherein the first feedback from the one or more sensors of the electronic device comprises data indicative of a temperature within the structure, a humidity within the structure, a pressure within the structure, or any combination thereof.

12. The method of claim 11, wherein generating the risk score by comparing the first feedback and the second feedback to the baseline data comprises executing an algorithm that includes the temperature within the structure, the humidity within the structure, and the pressure within the structure as inputs.

13. The method of claim 9, wherein generating the risk score by comparing the first feedback and the second feedback to the baseline data comprises executing a statistical analysis that compares the first feedback, the second feedback, and the baseline data to one another.

14. The method of claim 9, wherein the electronic device comprises a smart phone, a smart wearable device, a tablet, a laptop computer, a desktop computer, a voice-activated device, or any combination thereof.

15. A system, comprising:
   a first electronic device comprising one or more sensors configured to provide first feedback indicative of conditions within a structure and location information of one or more locations within the structure;
   a second electronic device configured to provide second feedback indicative of conditions outside of the structure over a network; and
   an electronic circuit comprising a processor configured to execute one or more instructions stored on a memory of the electronic circuit, wherein the one or more instructions are configured to:
   receive the first feedback from the first electronic device;
   receive the second feedback from the second electronic device;
   generate a risk score by comparing the first feedback and the second feedback to baseline data stored on the memory of the electronic circuit, wherein the risk score is representative of a likelihood that the first feedback is indicative of a presence of leaked water within the structure; and
   determine a water detection event when the risk score is equal to or exceeds a threshold value, wherein the structure is external to the first electronic device and water indicated by the water detection event is external to the first electronic device.

16. The system of claim 15, wherein the first feedback indicative of conditions within the structure comprises a temperature within the structure, a humidity within the structure, and a pressure within the structure.

17. The system of claim 15, wherein the first electronic device comprises a voice-activated computing device and the second electronic device comprises a server configured to receive third feedback indicative of weather conditions outside of the structure.

18. The system of claim 15, wherein the first electronic device comprises a smart phone, a smart wearable device, a tablet, a laptop computer, a desktop computer, a voice-activated device, or any combination thereof.

19. The system of claim 15, wherein the one or more sensors comprise a temperature sensor, a humidity sensor, a pressure sensor, or any combination thereof, and wherein the first electronic device is configured to provide the first feedback for a plurality of locations within the structure.

* * * * *